US010585876B2

(12) United States Patent
Brodt et al.

(10) Patent No.: US 10,585,876 B2
(45) Date of Patent: Mar. 10, 2020

(54) PROVIDING SNAPSHOT ISOLATION TO A DATABASE MANAGEMENT SYSTEM

(71) Applicant: International Business Machines Corporation, Armonk, NY (US)

(72) Inventors: Andreas Brodt, Gerlingen (DE); Daniel Martin, Stuttgart (DE); Oliver Schiller, Dettingen/Teck (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 15/224,959

(22) Filed: Aug. 1, 2016

(65) Prior Publication Data

US 2017/0293530 A1    Oct. 12, 2017

(30) Foreign Application Priority Data

Apr. 7, 2016   (GB) .................................. 1605937.0

(51) Int. Cl.
*G06F 16/11* (2019.01)
*G06F 16/23* (2019.01)

(52) U.S. Cl.
CPC ................ *G06F 16/2365* (2019.01)

(58) Field of Classification Search
CPC .. G06F 16/2365; G06F 16/23; G06F 16/2379; G06F 16/273; G06F 16/1873; G06F 9/466; G06F 2201/84; G06F 16/2329; G06F 16/1774; G06F 16/219; G06F 16/2308; G06F 16/2393; G06F 16/24539

(Continued)

(56) References Cited

U.S. PATENT DOCUMENTS 7,653,665 B1 *  1/2010  Stefani ................ G06F 16/2343
                                                           714/19
8,893,131 B2   11/2014  Ramakrishnan et al.
(Continued)

OTHER PUBLICATIONS

"Tuning the Oracle Connector performance in IBM InfoSphere DataStage, Part 1: Overview of the connector tuning process and optimization of fetch, lookup and DML operations", http://www.ibm.com/developerworks/data/library/techarticle/dm-1303datastageoracleconnector1/, Mar. 28, 2013, 27 pages.

*Primary Examiner* — Alex Gofman
*Assistant Examiner* — Linh Black
(74) *Attorney, Agent, or Firm* — Richard Wilhelm; Edell, Shapiro & Finnan, LLC

(57) ABSTRACT

Providing snapshot isolation to a database managed by a database management system includes providing a program module to analyze a plurality of database queries directed at a table of the database and generates a view for said table. The table comprises a counter value column and the view is configured to selectively read, upon being called, data records having assigned particular counter values. The program module modifies the view of said table such that the particular counter values comprise counter values generated at moments when the program module received respective write queries which have already committed at the moment of modifying the view, are free of counter values of data records having become outdated by an update statement committed at the moment of modifying the view, and are free of counter values generated by the counter after the moment of modifying the view.

18 Claims, 4 Drawing Sheets

(58) Field of Classification Search
USPC ......... 707/613, 615, 638–639, 802, 825–827
See application file for complete search history.

(56) References Cited

U.S. PATENT DOCUMENTS

| | | | |
|---|---|---|---|
| 8,935,205 B2* | 1/2015 | Hildenbrand | G06F 16/2315 |
| | | | 707/636 |
| 9,002,802 B2 | 4/2015 | Deshmukh et al. | |
| 9,075,841 B2* | 7/2015 | Larson | G06F 16/1865 |
| 9,177,004 B2 | 11/2015 | Bright | |
| 10,248,682 B2* | 4/2019 | Regni | G06F 16/2343 |
| 2008/0189438 A1* | 8/2008 | Zimmerer | H04L 67/2823 |
| | | | 709/246 |
| 2009/0240711 A1* | 9/2009 | Levin | G06F 16/217 |
| 2011/0153566 A1* | 6/2011 | Larson | G06F 9/466 |
| | | | 707/638 |
| 2012/0101997 A1* | 4/2012 | Zwilling | G06F 11/1451 |
| | | | 707/649 |
| 2012/0239612 A1 | 9/2012 | George et al. | |
| 2012/0265742 A1* | 10/2012 | Burckhardt | G06F 9/466 |
| | | | 707/694 |
| 2012/0266251 A1* | 10/2012 | Birtwhistle | G06F 19/3481 |
| | | | 726/26 |
| 2013/0117307 A1* | 5/2013 | Vishnoi | G06F 16/2343 |
| | | | 707/770 |
| 2013/0179473 A1* | 7/2013 | Heman | G06F 16/23 |
| | | | 707/797 |
| 2014/0223119 A1* | 8/2014 | McKenney | G06F 12/16 |
| | | | 711/162 |
| 2015/0242400 A1 | 8/2015 | Bensberg et al. | |
| 2016/0378819 A1* | 12/2016 | Bishop | G06F 16/27 |
| | | | 707/703 |
| 2017/0177658 A1* | 6/2017 | Lee | G06F 11/1451 |

* cited by examiner

PROVIDING SNAPSHOT ISOLATION TO A DATABASE MANAGEMENT SYSTEM

BACKGROUND

The present invention relates to database management systems, and more specifically to providing an insolation level to a database management system (DBMS).

In database systems, isolation determines how transaction integrity is visible to other users and systems. A lower isolation level increases the ability of many users to access data at the same time, but increases the number of concurrency effects (such as dirty reads or lost updates) users might encounter. Conversely, a higher isolation level reduces the types of concurrency effects that users may encounter, but requires more system resources and increases the chances that one transaction will block another.

Isolation is typically defined at database level as a property that defines how/when the changes made by one operation become visible to other.

A DBMS's concurrency control mechanisms handles isolation levels and guarantee related correctness of other DBMS processes. The mechanisms typically constrain the database data access operations' timing to certain orders characterized as the serializability and recoverability schedule properties. Constraining database access operation execution typically means reduced performance, and thus concurrency control mechanisms are typically designed to provide the best performance possible under the constraints of a desired isolation level. Often, when possible without harming correctness, the serializability property is compromised for better performance. However, recoverability cannot be compromised, since such typically results in a quick database integrity violation.

Two-phase locking is a common transaction concurrency control method in DBMSs, used to provide both serializability and recoverability for correctness. In order to access a database object a transaction first needs to acquire a lock for this object. Depending on the access operation type (e.g., reading or writing an object) and on the lock type, acquiring the lock may be blocked and postponed, if another transaction is holding a lock for that object.

When attempting to maintain the highest level of isolation, a DBMS usually acquires locks on data or implements multiversion concurrency control, which may result in a loss of concurrency. This may require adding logic for the application to function correctly.

Most DBMSs offer a number of transaction isolation levels, which control the degree of locking that occurs when selecting data. For many database applications, the majority of database transactions can be constructed to avoid requiring high isolation levels (e.g., SERIALIZABLE level), thus reducing the locking overhead for the system. The programmer must carefully analyze database access code to ensure that any relaxation of isolation does not cause software bugs that are difficult to find. Conversely, if higher isolation levels are used, the possibility of deadlock is increased. Avoiding deadlock also requires careful analysis and programming techniques.

The isolation levels defined by the ANSI/ISO SQL standard are, sorted in descending order beginning with the "highest/strictest" level: Serializable, Repeatable Read, Read Committed and Read Uncommitted. In addition, some DBMS support a "fifth" isolation level referred to as "Snapshot Isolation level". An overview of the above five isolation levels is given below:

| Isolation Level | Dirty Read | Nonrepeatable Read | Phantom | Ensured Conc. Transact. Compatibility * |
|---|---|---|---|---|
| Serializable | No | No | No | Yes |
| Snapshot | No | No | No | No |
| Repeatable Read | No | No | Yes | No |
| Read Committed | No | Yes | Yes | No |
| Read Uncommitted | Yes | Yes | Yes | No |

* Any serializable transaction that executes correctly when run alone will continue to execute correctly with any combination of concurrent transactions, or it will be rolled back with an error message.

Snapshot isolation is sometimes not supported by existing DBMS, such as lock-based concurrency control DBMS's. If a DBMS supports a snapshot isolation mode, it may, in some cases, not be used for performance and other reasons. Nevertheless, snapshot isolation level would provide significant advantages when managing large data volumes. In particular, in systems where data is transferred regularly from a source system to a target system, the load process may either result in inconsistencies in ongoing, concurrent read processes in the target system, or an extensive locking of the load process to protect the concurrent target system processes from "seeing" partially loaded data.

SUMMARY

It is an objective of the present invention to provide for an improved computer-implemented method, computer program product and corresponding control system as specified in the independent claims. Embodiments of the invention are given in the dependent claims. Embodiments of the present invention can be freely combined with each other if they are not mutually exclusive.

In one aspect, the invention relates to a computer-implemented method for providing snapshot isolation to a database managed by a database management system (DBMS). The method comprises:

analyzing, by a program module, a plurality of database queries submitted by a client application to the database, each of the queries comprising one or more read or write statements directed at a table of the database, the table comprising a counter value column;

generating a view for said table by the program module, the view being configured to selectively read, upon being called, data records having assigned particular counter values;

upon determining, by the program module, that one of the database queries comprises a write statement for inserting a new data record into the table, storing the new data record in association with a counter value, the counter value being provided by a counter that increases its value at least every time a data record is requested to be updated or is requested to be inserted in said table;

upon determining, by the program module, that one of the database queries comprises a write statement for updating one of the data records in the table, storing an updated copy of the data record in association with a counter value provided by said counter in the table;

modifying, by the program module, the view of said table such that the particular counter values:

comprise counter values generated at moments when the program module received respective write queries which have already committed at the moment of modifying the view, whereby the particular counter values are free of counter values of data records having become outdated by an update statement committed at the moment of modifying the view, and are free of counter values generated by the counter after the moment of modifying the view;

upon determining, by the program module, that one of the database queries comprises a read statement for reading one or more data records from the table, calling, by the program module, the view of the table instead of performing the read statement on the table and forwarding the data records provided by the view to the client application.

According to embodiments, the DBMS lacks an inbuilt support for managing transactions in accordance with the snapshot isolation level. In addition, or alternatively, the DBMS lacks an inbuilt support for managing transactions in accordance with the Atomicity, Consistency, Isolation, Durability (ACID) characteristics.

According to embodiments, the DBMS is a DBMS comprising an inbuilt table partition-based query optimization functionality. The program module modifies the table such that all data records comprising the same counter value are processed by the DBMS as data records belonging to the same table partition and such that data records comprising different counter values are processed by the DBMS as data records belonging to different table partitions, thereby enabling the inbuilt table-partition-based query optimization functionality to use the table partitions.

According to embodiments, the DBMS is a DBMS comprising an inbuilt table partition-based bulk delete functionality. The program module modifies the table such that all data records comprising the same counter value are processed by the DBMS as data records belonging to the same table partition and such that data records comprising different counter values are processed by the DBMS as data records belonging to different table partitions, thereby enabling the inbuilt table partition-based bulk delete functionality to delete partitions comprising data records which are outdated versions of one or more data records having been updated by an already committed update statement.

According to embodiments, the DBMS comprises a locking system that locks every added or deleted table row while it is being changed. The client application or the program module causes the locking system to operate in an uncommitted read isolation level that allows an application to access the uncommitted changes of other transactions. Nevertheless, the plurality of database queries are executed in accordance with the snapshot isolation level that is provided by the program module generating, modifying and calling the view.

In a further aspect, the invention relates to a computer program product configured for providing snapshot isolation to a database managed by a DBMS. The computer program product comprises a computer readable storage medium having program instructions embodied therewith, the program instructions executable by a processor to cause the processor to execute a method comprising:

analyzing a plurality of database queries submitted by a client application to the database, each of the queries comprising one or more read or write statements directed at a table of the database, the table comprising a counter value column;

generating a view for said table, the view being configured to selectively read, upon being called, data records having assigned particular counter values;

upon determining that one of the database queries comprises a write statement for inserting a new data record into the table, storing the new data record in association with a counter value, the counter value being provided by a counter that increases its value at least every time a data record is requested to be updated or is requested to be inserted in said table;

upon determining that one of the database queries comprises a write statement for updating one of the data records in the table, storing an updated copy of the data record in association with a counter value provided by said counter in the table;

modifying the view of said table such that the particular counter values:

comprise counter values generated at moments when a program module received respective write queries which have already committed at the moment of modifying the view, whereby the particular counter values are free of counter values of data records having become outdated by an update statement committed at the moment of modifying the view, and are free of counter values generated by the counter after the moment of modifying the view;

upon determining that one of the database queries comprises a read statement for reading one or more data records from the table, calling the view of the table instead of performing the read statement on the table and forwarding the data records provided by the view to the client application.

In a further aspect, the invention relates to a computer system comprising a program module for providing snapshot isolation to a database managed by the DBMS. The program module is configured to perform a method comprising:

analyzing a plurality of database queries submitted by a client application to the database, each of the queries comprising one or more read or write statements directed at a table of the database, the table comprising a counter value column;

generating a view for said table, the view being configured to selectively read, upon being called, data records having assigned particular counter values;

upon determining that one of the database queries comprises a write statement for inserting a new data record into the table, storing the new data record in association with a counter value, the counter value being provided by a counter that increases its value at least every time a data record is requested to be updated or is requested to be inserted in said table;

upon determining that one of the database queries comprises a write statement for updating one of the data records in the table, storing an updated copy of the data record in association with a counter value provided by said counter in the table;

modifying the view of said table such that the particular counter values:

comprise counter values generated at moments when a program module received respective write queries which have already committed at the moment of modifying the view, whereby the particular counter values are free of counter values of data records having become outdated by an update statement committed at the moment of modifying the view, and are free of counter values generated by the counter after the moment of modifying the view;

upon determining that one of the database queries comprises a read statement for reading one or more data records from the table, calling the view of the table instead of performing the read statement on the table and forwarding the data records provided by the view to the client application.

BRIEF DESCRIPTION OF THE DRAWINGS

In the following embodiments of the invention are explained in greater detail, by way of example only, making reference to the drawings in which.

DETAILED DESCRIPTION

Figure 1:
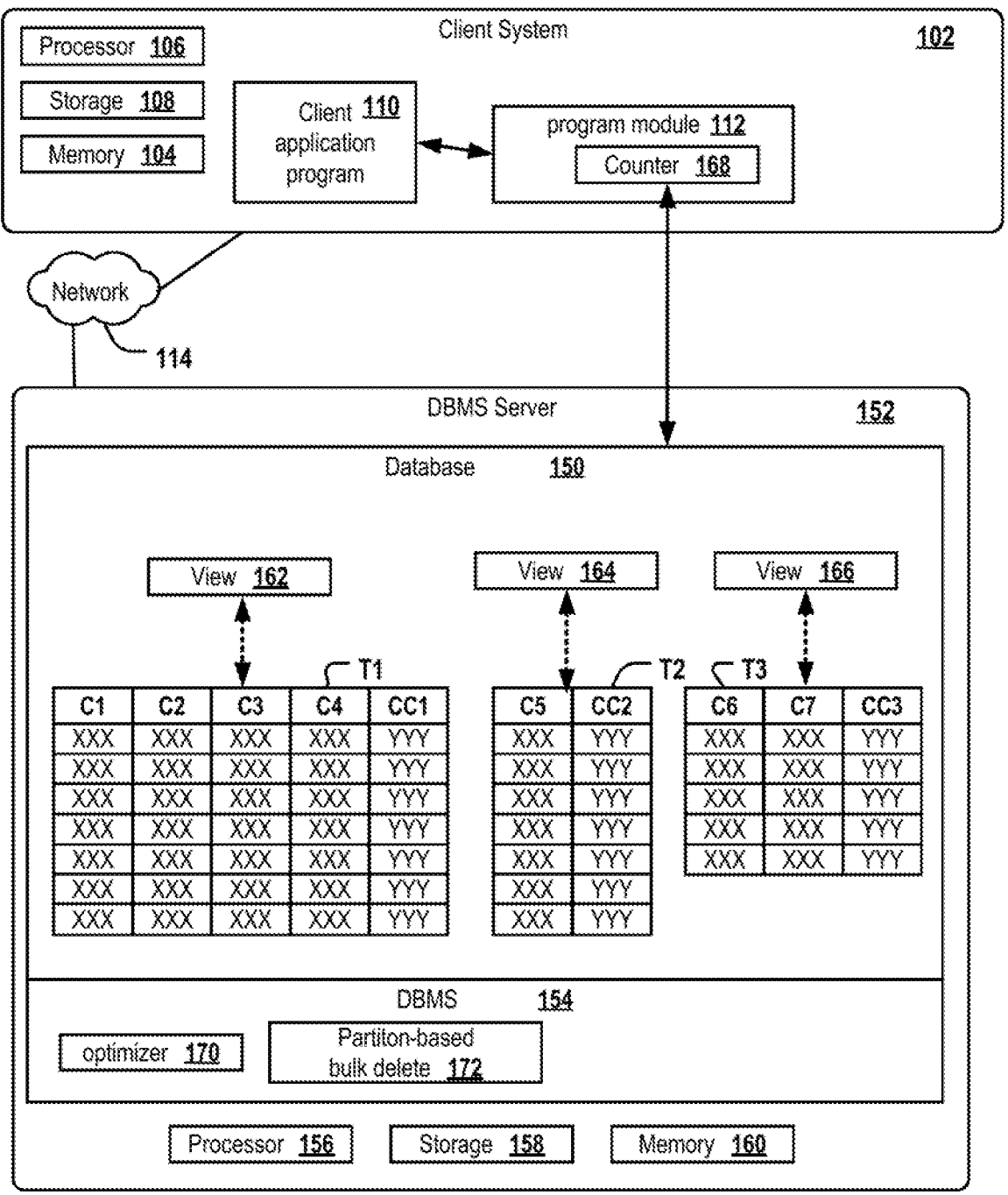
FIG. 1 depicts a system comprising a client-side program module for providing snapshot isolation to a DBMS according to an embodiment of the present invention.

Snapshot isolation is not supported in several types of DBMS, including most lock-based concurrency control DBMS. Embodiments of the invention may provide snapshot isolation functionality to DBMS without causing the decrease in performance that is typically associated with this strict form of isolation and without having to substantially modify the core functions of the DBMS. This may provide significant advantages when managing large data volumes.

For instance, bulk operations on large objects that cause significant challenges to lock-based DBMS may now be implemented with greatly reduced logging and locking overhead. Client applications may be allowed to choose, via the program module, which concurrency control scheme to use for the task at hand, and may be allowed to choose snapshot isolation without significantly reducing the performance of query processing. Specifically, using embodiments of the invention, traditional lock-based write-ahead logging Online transaction processing (OLTP) systems without partitioning may be able to support the following operations: large, atomic updates to tables, e.g., adding, removing or changing sizable fractions (or the even the entire content) of a large table. In lock-based DBMS, every added or deleted row is locked while it is being changed. Changing large fractions of a table puts significant stress on the lock subsystem and may lead to lock-escalation, e.g., the database system chooses to lock the entire table to reduce overhead, with the negative effect of blocking any concurrent activity on that table until the mass operation is completed. Likewise, every change may be logged for recovery reasons. Therefore, changing large volumes in state of the art DBMS's puts significant stress on the logging and locking subsystem, leading to significant input/output (I/O) overhead, performance and space problems. To the contrary, according to embodiments of the invention, the DBMS may not have to lock tables on which a read operation is performed. Nevertheless, the program module causing queries to execute read statements on the view instead of the table may ensure a consistent state of the table even without locking the table. Large change operations, e.g., load operations, take time, e.g., several minutes or even hours. As the query according to embodiments of the invention operates on the view rather than the original table, the view is available for queries during the entire time and will return the "old" state until the bulk operation is finished and the view is updated accordingly. At no point will a query see an "in-flight" or inconsistent state of the table. The switch between the state before and after the bulk operation is atomic as it corresponds to an atomic switch caused by updating the view.

Embodiments of the invention may allow data modification operations to issue intermediate commits to reduce transaction sizes. Moreover, embodiments of the invention may allow log performance and space problems to be avoided. Since queries operate on views which implement consistent snapshots over the base table, no additional lock-based isolation mechanism may be required to avoid inconsistent results from concurrent operations. All queries can run with isolation "uncommitted read", putting significant relief on the locking subsystem.

According to embodiments, at least one of the queries of the client application is a write query for loading a partition of a source database into the database. The partition of the source database comprises a plurality of data records having assigned the partition-ID of said partition of the source database. For example, the source database could be a conventional relational row oriented database, the database used as the target database could be an analytics database, e.g. IBM DB2 Analytics Accelerator for z/OS, and the partitions of the source database could be "conventional" partitions using e.g., value ranges on a particular column that typically represents an attribute of the data records, e.g., a numerical value or a date. The client application could be a data analysis application that is interoperable with the DBMS, e.g., the analytics accelerator and may be hosted on the same computer system as the analytics accelerator. Alternatively, the client application could be hosted on a remote device, e.g., a client device coupled to the DBMS via a network.

Upon the program module receiving the partition from the source database, the program module interacts with the counter and receives a current counter value from the counter. The program module stores the data records of the loaded partition in association with the received current counter value in the database such that the received counter value is stored in the counter value column of each data record stored in the target table of the target database. Upon committing the load operation, the program module modifies the view of the table to which the loaded partition is stored, such that the particular counter values specified in said view also comprise the counter value stored in association with the data records of the loaded partition and such that the particular counter values are free of counter values of any outdated version of the partition of the source database.

Load operations can be highly time consuming, in particular if atomicity of the load has to be ensured. This is typically the case in many combinations of source and target systems used e.g., for generating data records in a source database, e.g., an OLTP database, and regularly loading current versions of said data records to a target database that may be optimized for different types of queries. For example, the database receiving the data records can be an Online Analytical Processing (OLAP) database optimized for performing analytical queries. A common problem in this context is that an outdated version of the partition may already exist in the target database and several analytical queries may use this outdated version while the load process is performed. The load process may take several minutes or even hours for very large partitions. The analytical processes operating on the outdated data records may also last for several minutes or even hours, so simply using locks on any affected table in the target database could significantly reduce performance while performing the load process without locks may result in incorrect analytical results caused by the analytical query analyzing a mixture of outdated and current data records. By assigning each loaded partition a corresponding current counter value (or multiple counter values in case the partition is split into sub-partitions upon loading) and by performing the analytical read queries on the view with the updated particular counter values (instead of performing the read queries directly on the table actually receiving the loaded partition), it is possible to perform the loading of the partition from the source to the target database concurrently with ongoing or new analytical queries in both an efficient and atomic manner: as the current set of particular counter values in the view protects the ongoing analytical queries from "seeing" the newly loaded data records before the load process has committed, it is not necessary to use extensive locks in order to provide transactional atomicity of the load process. As soon as the load process has committed, the view specification changes, such that any new analytical query will "see" the loaded and committed data records. Typically, the loaded data records constitute a newer version of an already existing version of the source database partition. In this case, the outdated partition is hidden from any query received after the commit of the load process by removing the current counter values of the outdated data records from the "particular counter value list" of the view.

According to some embodiments, the original partition-IDs used by the source database are maintained also in the target database, e.g., in the form of an additional column. However, the partitioning used in the target database follows the counter values generated by the counter in response to receiving a write query. Thus, the partitioning used in the source database does not have an impact on the counter-value based partitioning used in the (target) database.

According to embodiments, the DBMS is a DBMS that lacks an inbuilt support for managing transactions in accordance with the snapshot isolation level and/or that lacks an inbuilt support for managing transactions in accordance with the ACID characteristics. Thus, embodiments of the invention may supplement an existing DBMS with the snapshot isolation functionality although the DBMS may not originally support said functionality. The supplementation with the new isolation level may be provided by the program module that may be implemented as a client-side library or program module that interoperates with the DBMS or as a plug-in of the DBMS. Thus, no or no major changes have to be made in the architecture of the DBMS and a large number of different DBMS systems may easily be supplemented with the snapshot isolation functionality.

According to embodiments, the counter values are timestamps indicating a moment of receiving, by the program module, database query or being transaction-IDs of respective transactions specified in one or more of the received database queries. According to some embodiments, the counter may automatically create a new, incremented counter value upon the program module receiving an INSERT or UPDATE statement, but not upon receiving a SELECT statement. In other embodiments, the counter may also be incremented upon the module receiving a SELECT statement, but the receipt of a SELECT statement will not result in a modification of the view of a table or of the particular counter values specified in said view.

According to embodiments, the program module provides the counter. This may be beneficial as even in case a DBMS lacks an inbuilt functionality for creating and managing transaction-IDs or partition-IDs or an autoincrement functionality, the program module may provide it. In other embodiment the DBMS may comprise a functionality for creating partition-IDs for the managed tables, but said transition-IDs are overwritten by the counter values provided by the counter.

According to embodiments, the DBMS is a DBMS that comprises an inbuilt table partition-based query optimization functionality. The program module modifies the table such that all data records comprising the same counter value are processed by the DBMS as data records belonging to the same table partition and such that data records comprising different counter values are processed by the DBMS as data records belonging to different table partitions. Thereby, the program module enables the inbuilt table-partition-based query optimization functionality to use the table partitions.

This may be beneficial as the use of partitions for query planning and optimizing may increase performance of the DBMS. Partitioning is a mechanism especially useful for lock-based database systems to be able to support and manage very large (e.g., hundreds of gigabytes) tables. Partitioning criteria typically are column value ranges (e.g., all rows with column counter value comprises a value in a given range). Certain table operations, like bulk load and unload, partition addition, deletion, and rotation can be applied to the partitions. Like the user data, indexes can be partitioned as well to manage their size. Partitions are also taken into account for query planning and execution, e.g., scan operations may be pruned to only target relevant partitions.

A 'partition' as used herein is a set of data records in a table having assigned the same counter value. It is thus a logical and—in some embodiments—also a physical unit of data that can be processed by partition-based operations if such operations are supported by a DBMS.

For example, this modification of a table can be done upon storing a counter value in association with new data record in the table. After having stored said new data record in association with its current counter value in the database table, e.g., the table "sales", the program module can execute an SQL command like "ALTER TABLE sales ADD PARTITION TID3378 STARTING '3378' ENDING '3379'" wherein 3378 is the counter value returned by the counter upon the program module received an INSERT query for said table "sales".

By taking advantage of data partitioning, data in a DBMS may be managed more efficiently while delivering optimum database performance. One advantage to using the counter values of the table as partition-IDs may be that only relevant data partitions are accessed during query execution; because the optimizers of many DBMS, e.g. of DB2, are data-partition aware, only relevant data partitions are scanned to resolve a query, resulting in fewer I/Os and higher query performance. Another advantage may be that new partitions can easily be added to increase the table range or existing tables containing data can easily be attached (rolled in), while partitions containing old or obsolete data can be removed (rolled out) and archived, for example, to meet company policies or federal laws that mandate record retention.

Moreover, the process of adding or deleting rows in a partition can be parallelized so that multiple threads operate on a single partition, without requiring an expensive locking and coordination protocol (like 2-phase commit) between them.

Embodiments of the invention making use of the partitioning functionality of DBMS may allow lock-based systems to deal with very large partition sizes (in the giga- and terabyte range). However, embodiments of the invention are not limited to lock-based DBMSs. In one embodiment, the partition size is limited to 1, so that every row is assigned a different counter value that acts as a partition-ID. In this case, snapshot isolation is provided on the level of individual rows, and the proposed partition-level operations add, replace and delete would correspond to the row-level operations INSERT, UPDATE and DELETE respectively.

According to embodiments, at least some of the partitions of the table are stored in different tablespaces on different physical hard drives. Thus, an additional performance gain may be achieved.

According to embodiments the DBMS is a DBMS comprising an inbuilt table partition-based bulk delete functionality. The method further comprising: modifying, by the program module, the table such that all data records comprising the same counter value are processed by the DBMS as data records belonging to the same table partition and such that data records comprising different counter values are processed by the DBMS as data records belonging to different table partitions, thereby enabling the inbuilt table partition-based bulk delete functionality to delete partitions consisting of data records which are outdated versions of one or more data records having been updated by an already committed update statement.

This may be advantageous as a very high mass-delete performance may be achieved: in order to make the deleted rows invisible for new transactions, all that needs to be done is to change the view definition so that the counter value (partition ID) of the deleted rows is no longer contained in the particular counter values specified in the view. This can be achieved by modifying a single integer number in the view specification and, thus, can be achieved quickly. Any new transactions will henceforth ignore those rows because the program module forces the new transaction on the view rather than on the respective table, thereby hiding any data records from the transaction whose counter value does not belong to the particular counter values specified in the view.

A "table partition-based bulk delete functionality" as used herein is a delete operation that physically deletes one or more data records in a single step.

According to embodiments, the partition-based bulk delete functionality uses a zone map table created for each table for physically deleting multiple data records having assigned a counter value corresponding to a committed, outdated transaction that is not contained in a set of particular counter values in any view of the database. Using a zone map function makes row-by-row evaluation (and elimination) largely unnecessary, thereby increasing deletion performance.

Zone maps are automatically generated, internal database tables that summarize the range of column values (minimum and maximum) of rows that fall into the same extent, that is, an addressable storage block on disk. Zone maps are always created for columns that were selected as organizing keys. Here, the zone maps are created for the counter value columns. For example, IBM® DB2® Analytics Accelerator for z/OS® supports creating and using zone maps for bulk deletes. Using the information in the zone maps, IBM DB2 Analytics Accelerator for z/OS "knows" which extents it needs to "look at" during a disk scan. Extents with deletion-relevant data (table rows containing the counter values specified in the corresponding view as deletion candidates) are scanned or otherwise quickly identified; those that contain current data are skipped in the deletion process. For other kinds of operations, zone maps may allow skipping the deletion candidates and scanning the other records relevant for the current query. Zone maps thus tell the query engine whether it is worth to look at a certain extent on disk. If it is, then the clusters within an extent allow the query engine to scan the table rows in the extent much faster because rows with relevant data will be found in the same block, while blocks that do not contain relevant data can be skipped entirely.

According to embodiments, the method further comprises:
  modifying, by the program module, the table such that all data records comprising the same counter value are processed by the DBMS as data records belonging to the same table partition and such that data records comprising different counter values are processed by the DBMS as data records belonging to different table partitions;
  determining, by the program module, that at least one of the partitions comprise data records which are outdated versions of one or more data records having been updated by an already committed update statement; and
  sending, by the program module, a delete command for the at least one partition to the DBMS.

State-of-the-art multi-version concurrency control systems must augment each and every deleted row with a delete time stamp. Other systems, such as DB2 BLU, must also mark every row as deleted in the tuple status column. This requires a plurality of I/O operations. To the contrary, present invention embodiments do not need a single transactional mass delete query in order to skip outdated data records: an atomic modification of the particular counter values in a view is sufficient for hiding outdated rows from a database query. The actual physical deletes are then executed asynchronously. Thus, the client application program and the program module do not have to explicitly call bulk delete operations. Rather, the program module can make use of inbuilt, speed-optimized inbuilt DBMS functionality for asynchronously (relative to performing transactional processing by the DBMS) deleting data records scheduled for deletion.

For example, in case the DBMS supports table partitioning and inbuilt partition-based deletes, the delete command may be a drop-partition command like "ALTER TABLE sales DROP PARTITION where counter_value=34534".

In case the DBMS does not support partition-based deletes, the program module may explicitly perform asynchronous delete operations on data records comprising counter values that correspond to committed transactions and that are not part of the particular set of counter values specified in any of the views of the database. An example of such an explicit delete command may be "DELETE from table where counter_value=34533".

The size of each partition depends on the number of data records created upon executing a particular UPDATE or INSERT statement.

According to embodiments, the modification of the view comprises: upon receiving, by the program module, one of the queries that comprises an insert or update statement for the table, modifying the view of said table such that the view comprises the counter value stored in association with the new data records generated by said statement, said counter value being stored in the view as a candidate for becoming one of the particular counter values. For example, the view may comprise a first specification of counter values whose corresponding data records are currently "seen" and returned to a query. Said first counter value specification is also referred to as "particular counter values". The view may comprise a second specification of counter values relating to current, not yet committed write transaction. Said second specification of counter values may also be referred to as "hidden" counter values. In addition, a view may comprise a further specification of counter values relating to deletion candidates.

Upon the program module determining that said update or write statement has committed, the program module modifies the view of said table such that the counter value candidate becomes a member of the particular counter values. In addition, in case said update or write statement was an update statement, the program module removes the one of the counter values stored in the table in association with one or more data records having become outdated by the commit of said update statement from the particular counter values.

Since modifying a view (to be more particular: modifying one or more sets of counter values specified in a view) can be performed very quickly and in an atomic manner, and as read queries are redirected by the program module to operate on the view instead of its corresponding table, each state of a view corresponds to a logical snapshot of its associated table and the switching between states can be performed quickly and easily without extensive blocking of tables.

According to embodiments, the DBMS comprises an asynchronous deletion functionality (asynchronous in respect to query processing). The method comprises:
- determining, by the program module, that one or more data records stored in the table in association with the same counter value have become outdated by a commit of an update statement having created updated versions of said data records;
- determining, by the program module, if one or more currently executed read statements exist that access the outdated data records;
- if no currently executed read statements exist that access the outdated data records, modifying the view of said table such that the counter value stored in association with the outdated data record is stored in the view as a candidate for asynchronous deletion, the candidate for asynchronous deletion not being one of the particular counter values, and notifying the asynchronous deletion functionality of the DBMS that the data rows stored in the table in association with said counter value of said outdated data records can safely be deleted.

The checking if a current read statements exists that accesses the outdated data records may ensure that no ongoing read query is terminated by a transition of a view into another state. The checking for outdated data records may be performed regularly to avoid the table becoming cluttered with outdated data records.

According to embodiments, the modification of the view is performed by using a soft invalidation function of the DBMS. A "soft invalidation function" as used herein is a process whereby access to an object being invalidated is allowed to continue.

For example, the database may comprise a view called VIEW1 for table T1. The program module may issue the command ALTER VIEW VIEW1 to modify VIEW1 for creating a new version of the view having an updated specification of the particular counter values. With hard invalidation, the ALTER VIEW statement will be forced to wait for an exclusive lock on VIEW1 until a currently performed SELECT * from view VIEW1 transaction has finished. With soft invalidation, the ALTER VIEW statement is not given an exclusive lock on the view. When the view is modified via a soft invalidation approach, the already running ("old") SELECT statement will continue to run using the "old" definition of the view, e.g., the definition of the view at the moment when the transaction comprising the old select statement begun. Once the SELECT statement has completed and the corresponding transaction committed, any subsequent attempts to use the old version of the view VIEW1 (even by the same user or process that just used it) will result in an error.

The program module, upon receiving a read request for a particular table from the client application, calls the view VIEW1 having been generated for said table instead of reading the data directly from the table. For example, the program module may execute SELECT * from VIEW1. The definition of VIEW1 may comprise the following SQL statement: SELECT * from table TABLE1 where counter value IS NOT in <<DELETED-COUNTERVALUE-SET>> and where counter_value IS in <<PARTICULAR-COUNTERVALUE-SET>> and where counter value <<CURRENT-COUNTERVALUE+1>>. Thereby, the DELETED-COUNTERVALUE-SET is a set of counter values of partitions having been scheduled for deletion already before receiving the read request, e.g., because of a previously received DELETE query or because of a previously received UPDATE query having created a newer version of the respective data records. The PARTICULAR-COUNTERVALUE-SET acts as a positive list of the counter values of the data records comprising current data records of write transactions having already committed at the moment of receiving the read request. The positive list may in fact be a counter value range so it is not necessary that all counter values are explicitly specified in the view specification. The expression "CURRENT-COUNTERVALUE+1" ensures that partitions created in response to INSERT or UPDATE queries received after the receipt of the read query are not returned even in case this INSERT or UPDATE query should have committed earlier than the read query.

According to embodiments, the asynchronous deletion functionality regularly deletes all data records which are stored in the table in association with a counter value that is stored in the view as deletion candidate counter vale. Preferentially, all data records stored in association with the same counter value are deleted in a single bulk delete operation.

According to embodiments, the program module configures the counter value column to be invisible to the client application. For example, the program module may perform an ALTER TABLE command to set an attribute of the counter value column to IMPLICITLY HIDDEN (e.g., in DB2). This may ensure that the client cannot see or modify the counter column.

According to embodiments, the DBMS comprises a locking system that is capable of locking every added or deleted table row while it is being changed. The client application or the program module causes the locking system to operate in an uncommitted read isolation level that allows an application to access the uncommitted changes of other transactions (and optionally does not prevent another application from accessing a row that is being read, unless that application is attempting to alter or drop the table), whereby the plurality of database queries are executed in accordance with the snapshot isolation level that is provided by the program module generating, modifying and calling the view.

Lock-based DBMSs may be slow in case large volumes of data have to be changed, inserted or deleted as such operations cause significant stress to the locking system. By operating the locking system of a DBMS in uncommitted read (UR) isolation level, the DBMS can operate faster as inefficient locking mechanisms to ensure higher isolation levels are not used. At the same time the program module, by continuously modifying a view for each table and redirecting a request to the view instead of the table as specified above, provides an even better isolation level (snapshot isolation) without relying on extensive locking of tables.

According to embodiments, the program module transforms each UPDATE statement into a sequence of an INSERT and a DELETE statement, the INSERT storing an updated version of an existing data record in combination with a current counter value in the table, the DELETE statement configured for deleting the outdated version of said data record once the counter value of the data records created by the INSERT statement have been included in the particular counter values specified in the view.

According to embodiments, the counter increases its value every time a data record is modified (because of an UPDATE statement) or newly inserted (because of an INSERT statement) in any other table of the database. This "global" counter may be beneficial as a counter is provided that generates a cross-table, database-wide homogeneously increasing value list and is able to uniquely identify the moment of receiving a particular query irrespective of the type and number of tables accessed by said query.

According to embodiments, the program module is a library stored on a client system hosting the client application. The client system is connected to the DBMS via a network, e.g., the internet. This may allow snapshot isolation level support to be provided to a DBMS without modifying the DBMS. Thus, each client application may use its respective copy of the program module.

According to an alternative embodiment, the program module is a proxy module connected via a network to the client application and to one or more additional client applications. This may allow an operator of a legacy DBMS to provide snapshot isolation support to the legacy DBMS for use by a plurality of clients without having to modify the DBMS or the client application programs.

According to still further embodiments, the program module is implemented as a plug-in of the DBMS or as an inbuilt program module of the DBMS.

According to embodiments, each state of a view corresponds to a logical snapshot of the table and to a specific set of particular counter values. Said particular set of counter values determines which ones of the data records of the table can be accessed by a currently received database query.

FIG. 1 depicts a distributed system comprising a client computer system 102 and a DBMS server 152. The client system comprises one or more processors 106, a non-volatile storage medium 108 and a main memory 104. The client system can be, for example, a standard computer, a notebook, a netbook, or a battery powered hand held mobile telecommunication device, e.g., a smartphone or a tablet computer. The client device hosts a client application program 110 configured for submitting database query to the DBMS 154 running on the DBMS server 152. In addition, according to the depicted embodiment, the client device hosts a program module 112 configured for processing the database queries of the client application and for submitting modified database queries to the DBMS. For example, program module 112 may be a library providing the client application 110 the option to submit database queries in a snapshot isolation context to the DBMS even in case the DBMS does not support said isolation level or uses extensive locking to provide it. For example, the program module may be written in Java, in C++ or any other programming language. The system may optionally comprise additional client systems that may also comprise a respective client application program and a copy of the program module 112 (not shown).

The program module may comprise a counter 168 that automatically increments by one unit each time the module 112 receives a write query, e.g., a sequence of one or more statements comprising at least one insert or one update statement, the series to be executed as a single, atomic transaction in its entirety or that shall be revoked in its entirety in case of an error occurs.

The DBMS server 152 hosts a DBMS 154, e.g. DB2 for z-OS, an Oracle database, a PostgreSQL or MySQL DBMS or the like. The server comprises one or more processors 156, a main memory 160, a non-volatile storage device 158 and is connected via a network 114 to one or more client computer systems 102. The DBMS 154 manages one or more databases 150 and comprises a query optimizer 170 that may consider also the partition structure of a table for optimizing a database query and comprises a partition-based bulk delete functionality 172 that may now be used for a new purpose, e.g., the efficient provision of a view-based isolation levels that uses efficient bulk deletion routines. In other embodiments (not shown), the program module may be hosted on a proxy computer of the DBMS server or may be hosted on the same server as the DBMS, e.g., in case the module 112 is provided as a plug-in of the DBMS.

The database comprises a plurality of database tables T1, T2, T3. Each table corresponds to a respective view 162, 164, 166 that was created and is continuously updated by the program module. The tables T1, T2, T3 respectively comprise one or more columns C1-C4, C5, C6-C7 comprising attribute values of respective data records. Each data record corresponds to a row in one or more of the tables. The program module is responsible for adding an additional column CC1, CC2, CC3 to each of the tables-side program module for storing current counter values provided by the counter 168 upon the program module 112 receiving an UPDATE or INSERT query.

Figure 2:
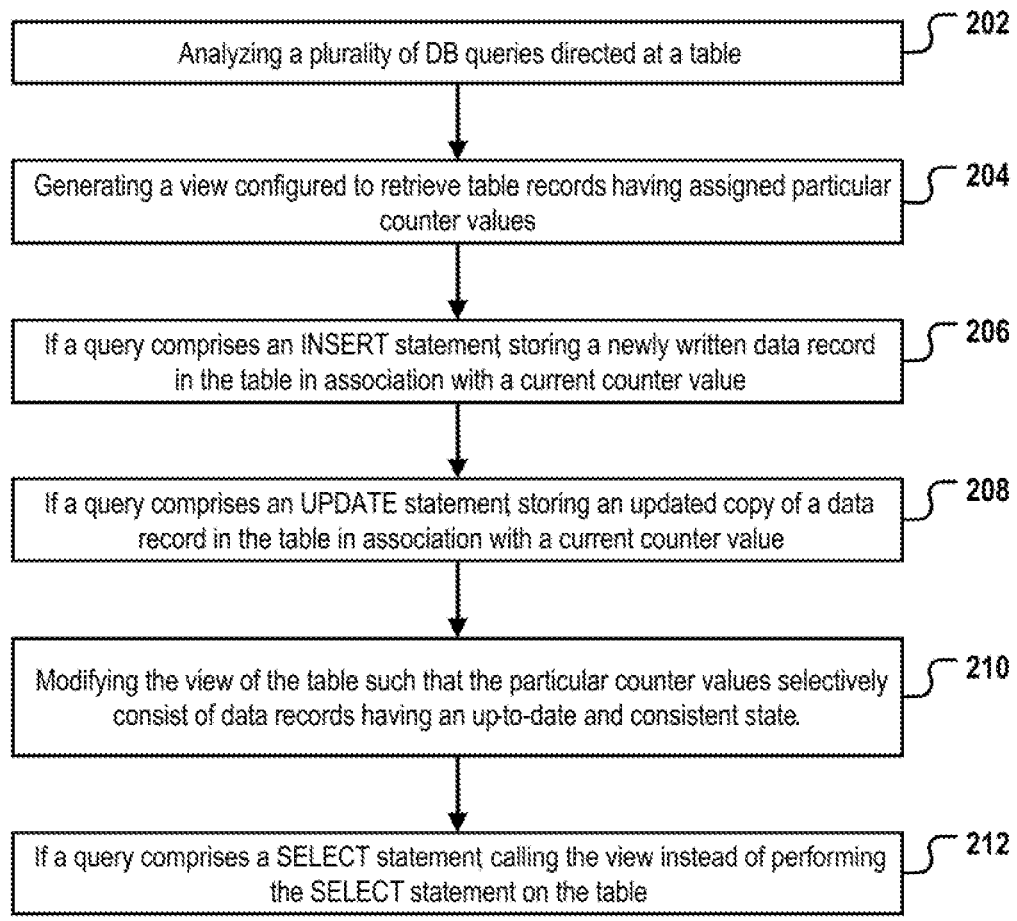
FIG. 2 depicts a flow chart of a method according to an embodiment of the present invention.

In operation, the program module 112 provides snapshot isolation to the database 150 managed by the DBMS 154 by performing a method that is described in the following by making reference to FIG. 2.

In step 202, the program module 112 analyzes a plurality of database queries submitted by a client application 110 to the database 150. Each of the queries comprises one or more read or write statements directed at a table T1, T2, T3 of the database. The table comprises a counter value column. For example, the program module may automatically create an additional column for each table accessed by a particular query in case this column does not already exist.

In step 204, the program module 112 generates a view for said table. For example, the module 112 may check if a view of the table to be accessed exists and may automatically create one if such a view does not exist. The view creation may be performed in response to the first query requesting read or write access to a particular table or may be performed independently of any query. For example, for table T1, view 162 is created that is configured to selectively read, upon being called, data records having assigned particular counter values from table T1. For table T2, view 164 is created that is configured to selectively read, upon being called, data records having assigned particular counter values from table T2. And so on.

In step 206, if the program module determines that one of the database queries comprises a write statement for inserting a new data record into the table, the module stores the new data record in association with a counter value provided by the counter 168 in said table. The counter 168 is configured to increase its value at least every time a data record is requested to be updated or is requested to be inserted in said table.

In step 208, if the program module determines that one of the database queries comprises a write statement for updating one of the data records in the table, the program module stores an updated copy of the data record in association with a counter value provided by said counter in the table. It is important to note that an UPDATE statement is rewritten by the program module into an INSERT and a DELETE statement, so instead of actually updating the existing data record in the table, the existing record is not modified. Rather, an updated, additional data record copy is created and stored in the table in association with a newly created, current counter value that is stored in the counter value column of the table.

In step 210, the program module modifies the view of said table such that the particular counter values:
  comprise counter values generated at moments when a program module received respective write queries (a query comprising an insert or update statement) which have already committed at the moment of modifying the view,
  whereby the particular counter values are free of counter values of data records having become outdated by an update statement committed at the moment of modifying the view, and
  are free of counter values generated by the counter after the moment of modifying the view.

To be more particular, the program module may update the view upon receiving a write query comprising a DELETE statement to update a list of counter values that correspond to deletion candidate counter values, e.g., counter values assigned to data records whose deletion was requested but which could not yet be deleted due to an ongoing read or write transaction operating on said records. The program module may update the view upon receiving a write query comprising an INSERT statement to update a list of counter values that correspond to particular counter value candidates, e.g., counter values assigned to data records which are currently stored in the table but whose corresponding write transaction has not committed yet. The program module may update the view upon receiving a write query comprising an UPDATE statement to update a list of counter values that correspond to particular counter value candidates, e.g., counter values assigned to updated versions of existing data records which are currently stored in the table but whose corresponding write transaction has not committed yet.

The program module may update the view upon a commit of a write query by adding the counter values of the newly written data records to the particular counter values whose data records are to be retrieved by calling the view. e.g., counter values assigned to updated versions of existing data records which are currently stored in the table but whose corresponding write transaction has not committed yet.

In step 212 the program module determines that one of the database queries comprises a read statement for reading one or more data records from the table. In response to said determination, the program module calls the view of the table instead of performing the read statement on the table and forwarding the data records provided by the view to the client application.

Figure 3:
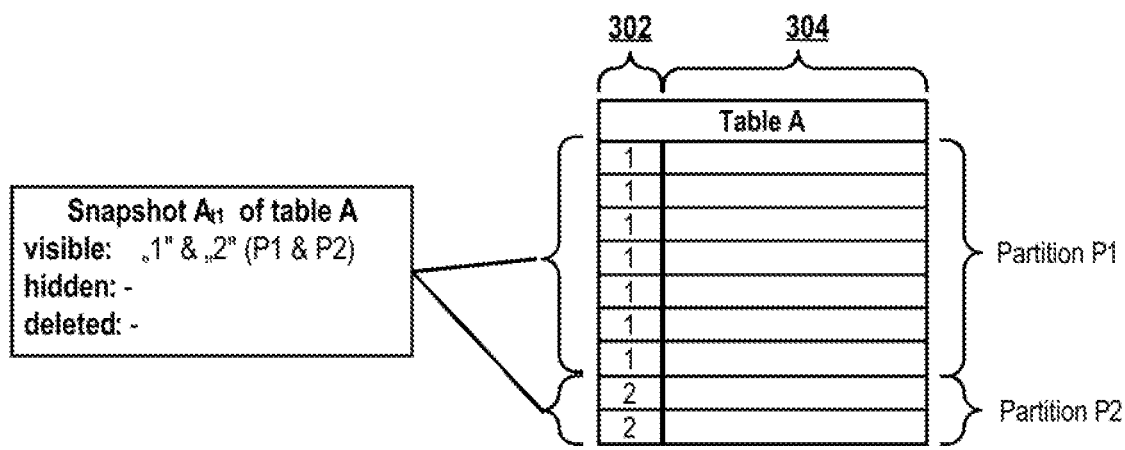
FIG. 3 depicts a view corresponding to a snapshot of a table at time t1 having two partitions, according to an embodiment of the present invention.

FIG. 3 depicts a view (box on the left side of the figure) corresponding to a snapshot of a table "A" at time t1. At this moment, the table has two partitions P1 and P2. All data records of partition P1 have assigned a counter value "1" and all data records of partition P3 have assigned counter value "2". The table comprises one or more "normal" columns 304 for storing attribute values of data records. In addition, the module 112 has created an additional column 302 referred herein as counter value column that is used to store a counter value. The counter values are output, for example, by a global, monotonously increasing counter that increases its value by 1 every time a data modification operation on the table (e.g., an INSERT or UPDATE statement to be performed on said table) is requested.

In FIG. 3, only one table and corresponding column 304 is shown. However, a new column for storing counter values is added to every table that requires snapshot isolation. Preferentially, column 302 is "invisible" to client applications not explicitly asking for it, e.g., by defining it IMPLICITLY HIDDEN in DB2.

At t1, the partitions P1 and P2 are "visible" to a query as the corresponding counter values of said visible partitions, "1" and "2", constitute the particular counter values specified in the view. This is represented in FIG. 3 by the counter values "1" & "2" marked as "visible". At t1, the view of table A does not comprise any counter values marked as "hidden" or "deleted".

In some embodiments, the counter value column is used to implement partitioning on the table, e.g., every row belongs to exactly one partition.

According to some embodiments, the column 302 has an additional function: the counter value or a flag in an additional column (not shown) indicates if a particular partition is an updated version of an existing, now outdated partition. For example, the partition 2 is an outdated version of partition 2' (see FIG. 5).

The program module 112 processes and modifies queries of client applications such that read queries do not reference table A directly, but the corresponding view instead. The definition of the view is updated before and after each data modification operation. This implements isolation of (potentially concurrent) modifications of the table, so that these modifications are not visible to queries as they are being carried out. Counter of currently modified data records may be listed in a view as "hidden" or "particular counter value candidates" and they become one of the particular counter values of the view after the modification completed. As a result, each version of a view definition represents a snapshot on the referenced table by defining the visibility of exactly one version of each partition.

FIGS. 4-7 demonstrate the effect of three basic operations (adding, removing and replacing a partition and corresponding data records) on table A and the corresponding view.

FIG. 3 shows the initial situation: At time t1 only rows for partition P1 and P2 are visible; there is no other data in the table.

Figure 4:
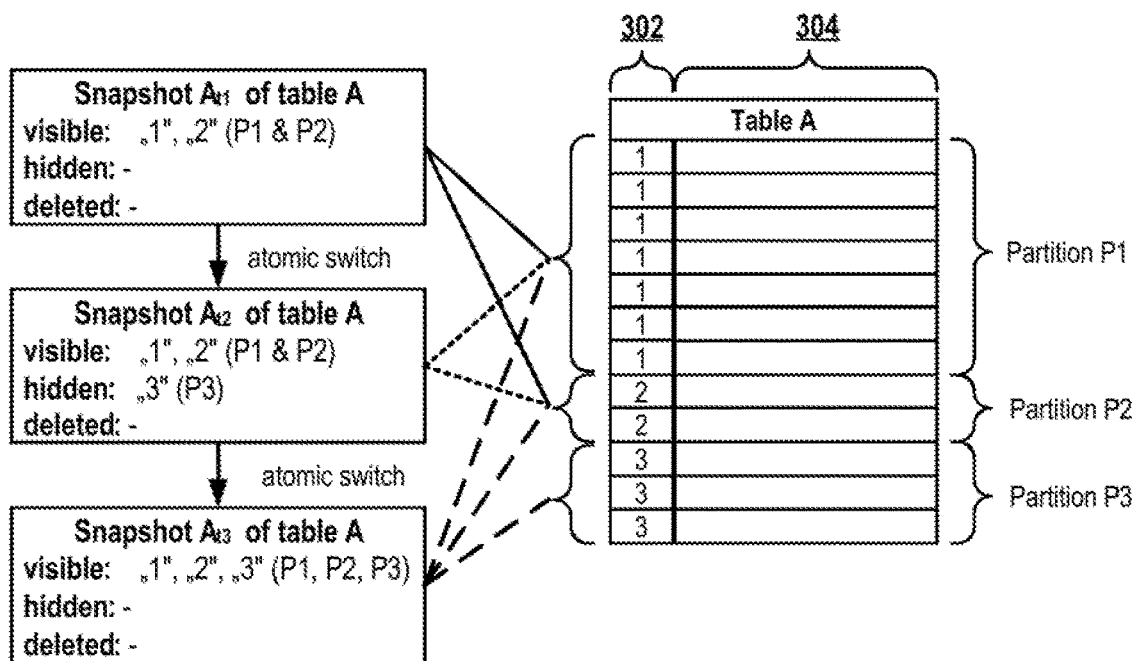
FIG. 4 depicts switching of states of a view, each state corresponding to a snapshot of the table, upon adding a partition, according to an embodiment of the present invention.

FIG. 4 depicts the switching of states of a view, each state corresponding to a snapshot of the table, upon adding a partition. In particular, FIG. 4 shows the process of adding a new partition to table A: Upon receiving an INSERT statement for inserting three new data records in table A, a new counter value "3" is obtained from the global counter 168. The program module 112 modifies the view definition (e.g., via a CREATE OR REPLACE VIEW command) to filter (hide) all rows from the table with counter value==3. This results in Snapshot $A^{t2}$.

New rows are added to the table via INSERT or an external utility (e.g., LOAD). As the partition ID/counter value "3" is not one of the particular counter values ("visible counter values) of the view but rather is marked as "hidden", the reading of uncommitted data changes is prohibited.

According to embodiments, the program module automatically generates multiple commit statements, referred herein as interim commit statements, and performs the statements of said transaction in multiple commits.

For example, the program module may create a commit statement every predefined number of statements in a transaction, e.g., every 1000 statements. This may have the advantage of avoiding log space problems: DBMSs using write-ahead logging may face the challenge that large transactions (comprising e.g., a million INSERT statements for storing a billion rows) may cause the DBMS to log large amounts of data to a transaction journal on a non-volatile storage. The logging may be performed for recovery purposes in case the system crashes while the transaction is still going on. Only after the transaction completed (commit), this journal file can be cleaned up and truncated. Thus, it may happen that the logging process for huge transaction uses all available disk space before it commits and that the database system can only shut down and wait for a user to make room on the disks. Embodiments of the invention may allow avoiding this situation by automatically generating intermediate commits (e.g., every 100 k rows), thereby reducing the size of the journal log records per commit. Nevertheless, the transactional context and isolation of the original, large transaction is maintained and the result of the entire modification (billion row changes) are only visible when all statements in the original, large transaction have completed, because the partition corresponding to said large original transaction is hidden in the view specification (not contained in the particular counter values specified in the view) and visible only after the view change. Thus, contrary to "normal commits", an automatically generated intermediate commit does not make the data rows stored by statements having committed in said intermediate commit visible to a client application. Thus, log space problems may be avoided or at least reduced.

Figure 5:
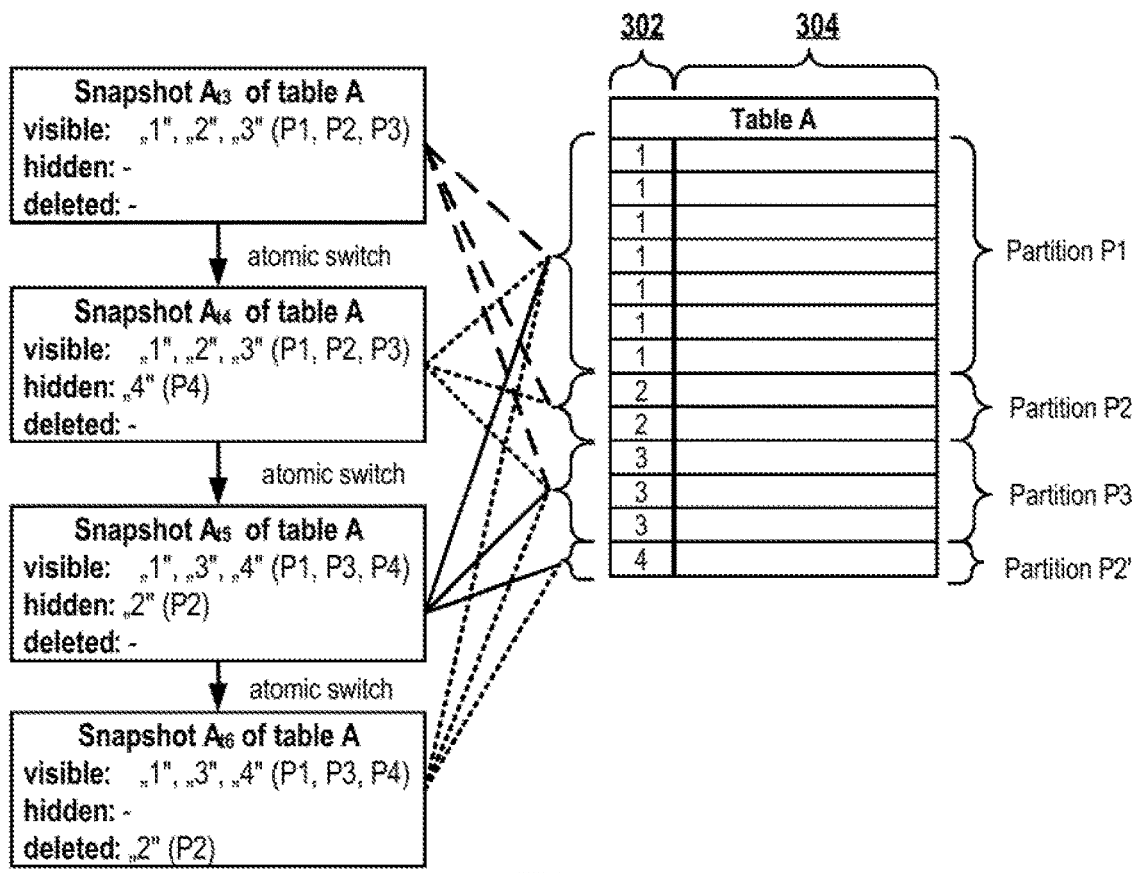
FIG. 5 depicts the switching of states of a view, each state corresponding to a snapshot of the table, upon replacing an outdated partition for performing an UPDATE query, according to an embodiment of the present invention.

After all new rows arrived and are committed, the view definition is changed again to add the counter value "3" to the particular ("visible") counter values, resulting in Snapshot $A_{t3}$ FIG. 5 depicts the switching of states of a view, each state corresponding to a snapshot of the table, upon replacing an outdated partition for performing an UPDATE query. In the depicted example, all rows of partition P2 are replaced to form P2' (partition 2 is refreshed with newer values). The replacement may comprise the following steps:

1. At first, a new counter value "4" is obtained from the global counter 168 and is used as a new partition ID).
2. Then, the program module changes the view definition to hide all rows with counter value "4" from queries, resulting in Snapshot $A_{t4}$
3. The new rows replacing partition P2 are added to the table, whereby partition-ID/counter value 4 is used for all new rows. This operation may issue interim commit operations to avoid log space problems.
4. After all rows of the new partition are stored and committed, the view definition is changed again to make all rows with counter value 4 visible (by making them part of the "set of particular counter values"), and to hide all rows with counter value "2" at the same time, resulting in Snapshot $A_{t5}$.

At this point, queries that started before step 4 may still be referencing rows with counter value "2" because they called the view at its state before step 4 was executed. Queries that started after step 4 are referencing rows with counter value "4" as they called the view in a different state with a modified set of particular counter values. In both cases, the queries "see" consistent data; at no point will a query be able to see an inconsistent mix between the states before and after replacing the entire partition, although the replacement process itself may have used multiple intermediate commits.

The program module may then determine that there is no more query referencing "old" rows with counter value "2", and may schedule all rows with counter value "2" for asynchronous deletion. Deletion of the rows results in Snapshot $A_{t6}$ (the view does not need to be modified). Since all rows with counter value 2 are no longer visible to queries, deletion can again happen in "chunks", optionally with intermediate commits to avoid logging problems.

Figure 6:
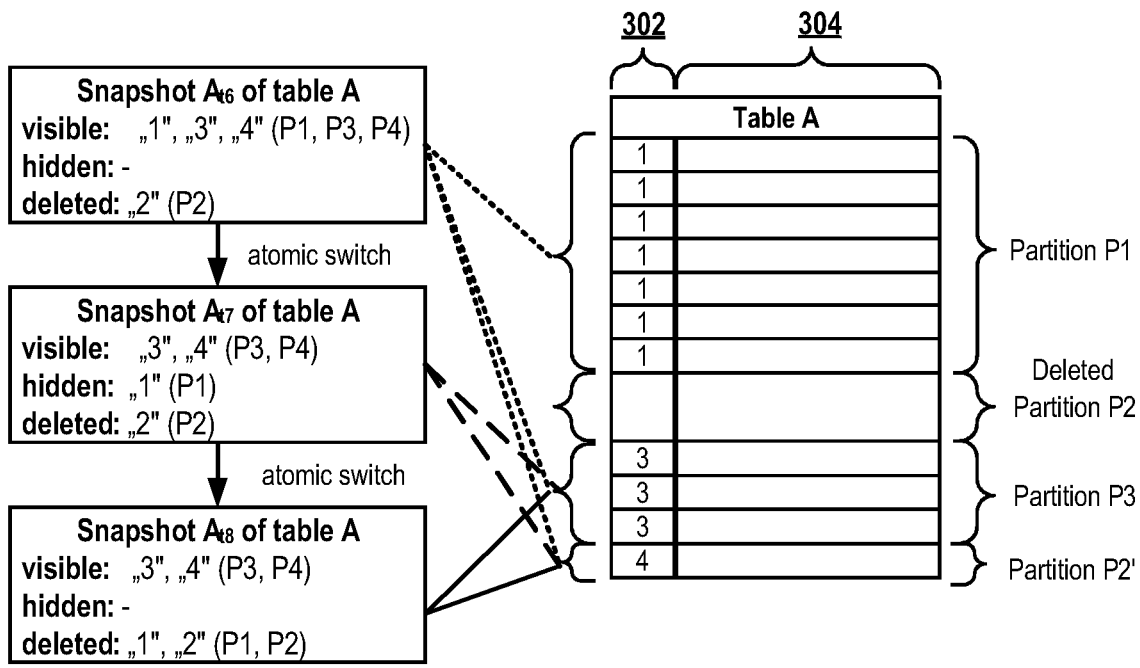
FIG. 6 depicts the process of deleting partition P1, according to an embodiment of the present invention.

FIG. 6 depicts the process of deleting partition P1. At first, the view definition is changed to hide all rows with counter value "1", resulting in Snapshot $A_{t7}$ and a corresponding view state. The program module 112 determines that there is no more query referencing rows with counter value "1" and schedules all rows with counter value "1" for asynchronous deletion. Deletion of the rows results in Snapshot $A_{t8}$. Since all rows with counter value "1" are no longer visible to queries, deletion can happen in "chunks", with intermediate commits to avoid logging problems. The final state of table A, after adding partition 3, replacing partition 2 by 2' and deleting partition 1 is depicted in FIG. 7.

Figure 7:
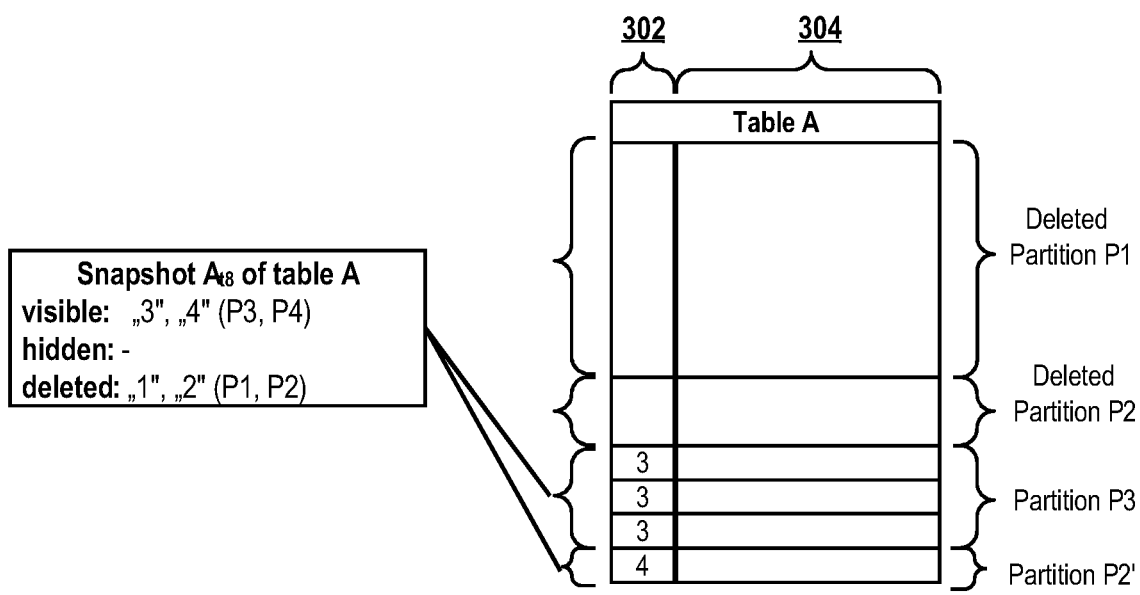
FIG. 7 depicts the states of the view after having deleted partitions P1 and P2, according to an embodiment of the present invention.

FIG. 7 depicts the state of the view after having added partition P3 and after having deleted partitions P1 and P2. Partitions P2' and P3 are visible to queries, partition P1 and P2 have been deleted.

Preferentially, all state switching operations of the view are performed atomically, e.g., via CREATE OR REPLACE VIEW. Thus, the branching-off of a new definition to make it available to new queries that started after the switch completed, while at the same time keep the old definition around for any work that referenced it at the time the switch happened, is atomic: a query will not see any intermediate state resulting from uncommitted write statements. The atomic switching of states of a view may be implemented, for example, by "soft invalidation" techniques that are provided by some current DBMS such as DB2. Changing a view soft—invalidates its associated instances (or "versions") in the package cache, but keeps them around until all referencing work is completed. A "package cache" as used herein is a cache of a DBMS configured for storing instances of database objects, e.g., tables and/or views, until they are no longer needed, e.g., until there is no query in the DBMS that still references this database object. At the same time, all work that arrives after the view update completed will be cached into new objects making the new view definition effective. The soft-invalidation mechanism can be used to detect when a particular version of a view (that is representing a specific snapshot) is no longer required. The cached objects are assigned a version number, and this number is associated with the partition(s) that were hidden as part of a view switch operation. The version number can now be used to detect if there still exists a query running on the hidden partitions. If the cached objects for the view version where a partition was hidden and marked for deletion is no longer active, it can be scheduled for physical deletion, as it is then guaranteed that there is no query running that still references the old data. According to an alternative implementation, the DBMS or the program module 112 in interoperation with the DBMS monitors all queries entering the DBMS and taking note of the tables they reference plus their entry and exit times. Timestamps may be used as counter values. Together with the timestamps of the view switch operations, it can be determined if a hidden partition marked for deletion can be deleted or must still be kept for queries: all queries must be gone that started earlier than the creation time of the view definition that was used to hide the partition scheduled for deletion.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for providing snapshot isolation to a database managed by a database management system, the method comprising:
analyzing, by a program module, a plurality of database queries submitted by a client application to the database, each of the queries comprising one or more read or write statements directed at a table of the database, wherein the database management system managing the database lacks an inbuilt support for managing transactions in accordance with a snapshot isolation level;
adding, by the program module, a counter value column to the table and configuring the counter value column to be invisible to the client application;
generating, by the program module, a view for said table by executing a query specifying sets of counter values for data records, the view being configured to selectively read, upon being called, data records having assigned particular counter values, wherein the view is associated with a plurality of sets of counter values including a set of counter values for data records of committed transactions, a set of counter values for updated data records of uncommitted transactions, and a set of counter values for deleted data records of uncommitted transactions;
upon determining, by the program module, that one of the database queries comprises a write statement for inserting a new data record into the table, storing the new data record in association with a counter value in the table, the counter value being inserted into the set of counter values for updated data records of uncommitted transactions and provided by a counter that increases its value at least every time a data record is requested to be updated or is requested to be inserted in said table;
upon determining, by the program module, that one of the database queries comprises a write statement for updating one of the data records in the table, storing an updated copy of the data record in association with a counter value provided by said counter in the table and inserting the provided counter value into the set of counter values for updated data records of uncommitted transactions;
modifying, by the program module, the view of said table by modifying one or more of the plurality of sets of counter values for the query based on results of transactions such that the query produces the modified view with data records associated with counter values that:
are generated at moments when the program module received respective write queries which have already committed at a moment of modifying the view,
are free of counter values of data records having become outdated by an update statement committed at the moment of modifying the view, and
are free of counter values generated by the counter after the moment of modifying the view;
upon determining, by the program module, that one of the database queries comprises a read statement for reading one or more data records from the table, calling, by the program module, the view of the table instead of performing the read statement on the table and forwarding the data records provided by the view to the client application;
upon determining, by the program module, that at least one of the queries comprises a write query for loading a partition of a source database comprising a plurality of data records into the database, receiving a current counter value from the counter and storing the data records of the partition in association with the received current counter value in the database in response to receiving the partition from the source database, wherein the plurality of data records of the partition having assigned a partition-ID of said partition of the source database;
upon committing a load operation, modifying, by the program module, the view of said table such that the particular counter values comprise the counter value stored in association with the data records of the loaded partition and such that the particular counter values are free of counter values of any outdated version of the partition of the source database.

2. The computer-implemented method of claim 1, the database management system being a database management system that lacks an inbuilt support for managing transactions in accordance with Atomicity, Consistency, Isolation, Durability (ACID) characteristics.

3. The computer-implemented method of claim 1, wherein the counter values comprise at least one from a group of: timestamps indicating a moment of receiving, by the program module, a database query; and transaction-IDs of respective transactions specified in one or more of the received database queries.

4. The computer-implemented method of claim 1, wherein the database management system comprises an inbuilt table partition-based query optimization functionality, and the method further comprises:
modifying, by the program module, the table such that all data records comprising a same counter value are processed by the database management system as data records belonging to a same table partition and such that data records comprising different counter values are processed by the database management system as data records belonging to different table partitions, thereby enabling the inbuilt table partition-based query optimization functionality to use the table partitions.

5. The computer-implemented method of claim 1, wherein the database management system comprises an inbuilt table partition-based bulk delete functionality, the method further comprising:
modifying, by the program module, the table such that all data records comprising a same counter value are processed by the database management system as data records belonging to a same table partition, such that data records comprising different counter values are processed by the database management system as data records belonging to different table partitions, thereby enabling the inbuilt table partition-based bulk delete functionality to delete partitions comprising data records which are outdated versions of one or more data records having been updated by an already committed update statement.

6. The computer-implemented method of claim 1, further comprising:
modifying, by the program module, the table such that all data records comprising a same counter value are processed by the database management system as data records belonging to a same table partition and such that data records comprising different counter values are processed by the database management system as data records belonging to different table partitions;
determining, by the program module, that at least one of the partitions comprises data records which are outdated versions of one or more data records having been updated by an already committed update statement; and
sending, by the program module, a delete command for the at least one partition to the database management system.

7. The computer-implemented method of claim 1, wherein modifying the view further comprises:
upon receiving, by the program module, one of the queries that comprises an insert or update statement for the table, modifying the view of said table such that the view comprises the counter value stored in association with the new data records generated by said insert or update statement, said counter value being stored in the view as a candidate for becoming one of the particular counter values;
upon determining, by the program module, that said insert or update statement has committed, modifying the view of said table such that:
the counter value candidate becomes a member of the particular counter values; and
in case of an update statement, removing one of the counter values stored in the table in association with one or more data records having become outdated by the commit of said update statement from the particular counter values.

8. The computer-implemented method of claim 1, wherein the database management system comprises an asynchronous deletion functionality, the method comprising:
determining, by the program module, that one or more data records stored in the table in association with a same counter value have become outdated by a commit of an update statement having created updated versions of said outdated data records;
determining, by the program module, when one or more currently executed read statements exist that access the outdated data records;
when no currently executed read statements exist that access the outdated data records, modifying the view of said table such that the counter value stored in association with the outdated data records is stored in the view as a candidate for asynchronous deletion, the candidate for asynchronous deletion not being one of the particular counter values, and notifying the asynchronous deletion functionality of the database management system that data rows stored in the table in association with said counter value of said outdated data records can be safely deleted.

9. The computer-implemented method of claim 8, wherein the modification of the view for asynchronous deletion is performed using a soft invalidation function of the database management system.

10. The computer-implemented method of claim 8, further comprising:
regularly deleting, by the asynchronous deletion functionality, all data records stored in the table in association with a counter value stored in the view as a deletion candidate counter value, whereby all data records stored in association with the same counter value are deleted in a single bulk delete operation.

11. The computer-implemented method of claim 1, wherein the database management system comprises a locking system that locks every added or deleted table row while it is being changed, and the method further comprises:
causing, by the client application or by the program module, the locking system to operate in an uncommitted read isolation level that allows an application to access uncommitted changes of other transactions, whereby the plurality of database queries are executed in accordance with a snapshot isolation level that is provided by the program module generating, modifying and calling the view.

12. The computer-implemented method of claim 1, wherein the counter also increases its value every time a data record is modified or inserted in any other table of the database.

13. The computer-implemented method of claim 1, wherein the program module comprises one or more from a group of:
a library stored on a client system hosting the client application, the client system being connected to the database management system via a network;
a proxy module connected via a network to the client application and to one or more further client applications; and
an inbuilt program module of the database management system.

14. The computer-implemented method of claim 1, wherein each state of a view corresponding to a logical snapshot of the table and to a specific set of particular counter values determines which of the data records of the table can be accessed by a currently received database query.

15. A computer program product for providing snapshot isolation to a database managed by a database management system, the computer program product comprising a computer readable storage medium having program instructions embodied therewith, the program instructions executable by a processor to cause the processor to execute a method comprising:
analyzing a plurality of database queries submitted by a client application to the database, each of the queries comprising one or more read or write statements directed at a table of the database, wherein the database management system managing the database lacks an inbuilt support for managing transactions in accordance with a snapshot isolation level;
adding a counter value column to the table and configuring the counter value column to be invisible to the client application;
generating a view for said table by executing a query specifying sets of counter values for data records, the view being configured to selectively read, upon being called, data records having assigned particular counter values, wherein the view is associated with a plurality of sets of counter values including a set of counter values for data records of committed transactions, a set of counter values for updated data records of uncommitted transactions, and a set of counter values for deleted data records of uncommitted transactions;

upon determining that one of the database queries comprises a write statement for inserting a new data record into the table, storing the new data record in association with a counter value in the table, the counter value being inserted into the set of counter values for updated data records of uncommitted transactions and provided by a counter that increases its value at least every time a data record is requested to be updated or is requested to be inserted in said table;

upon determining that one of the database queries comprises a write statement for updating one of the data records in the table, storing an updated copy of the data record in association with a counter value provided by said counter in the table and inserting the provided counter value into the set of counter values for updated data records of uncommitted transactions;

modifying the view of said table by modifying one or more of the plurality of sets of counter values for the query based on results of transactions such that the query produces the modified view with data records associated with counter values that:

are generated at moments when a program module received respective write queries which have already committed at a moment of modifying the view, are free of counter values of data records having become outdated by an update statement committed at the moment of modifying the view, and are free of counter values generated by the counter after the moment of modifying the view;

upon determining that one of the database queries comprises a read statement for reading one or more data records from the table, calling the view of the table instead of performing the read statement on the table and forwarding the data records provided by the view to the client application;

upon determining that at least one of the queries comprises a write query for loading a partition of a source database comprising a plurality of data records into the database, receiving a current counter value from the counter and storing the data records of the partition in association with the received current counter value in the database in response to receiving the partition from the source database, wherein the plurality of data records of the partition having assigned a partition-ID of said partition of the source database;

upon committing a load operation, modifying the view of said table such that the particular counter values comprise the counter value stored in association with the data records of the loaded partition and such that the particular counter values are free of counter values of any outdated version of the partition of the source database.

16. A computer system comprising a processor and a program module for providing snapshot isolation to a database managed by a database management system, the program module being configured to cause the processor to perform a method comprising:

analyzing a plurality of database queries submitted by a client application to the database, each of the queries comprising one or more read or write statements directed at a table of the database, wherein the database management system managing the database lacks an inbuilt support for managing transactions in accordance with a snapshot isolation level;

adding a counter value column to the table and configuring the counter value column to be invisible to the client application;

generating a view for said table by executing a query specifying sets of counter values for data records, the view being configured to selectively read, upon being called, data records having assigned particular counter values, wherein the view is associated with a plurality of sets of counter values including a set of counter values for data records of committed transactions, a set of counter values for updated data records of uncommitted transactions, and a set of counter values for deleted data records of uncommitted transactions;

upon determining that one of the database queries comprises a write statement for inserting a new data record into the table, storing the new data record in association with a counter value in the table, the counter value being inserted into the set of counter values for updated data records of uncommitted transactions and provided by a counter that increases its value at least every time a data record is requested to be updated or is requested to be inserted in said table;

upon determining that one of the database queries comprises a write statement for updating one of the data records in the table, storing an updated copy of the data record in association with a counter value provided by said counter in the table and inserting the provided counter value into the set of counter values for updated data records of uncommitted transactions;

modifying the view of said table by modifying one or more of the plurality of sets of counter values for the query based on results of transactions such that the query produces the modified view with data records associated with counter values that:

are generated at moments when the program module received respective write queries which have already committed at a moment of modifying the view, are free of counter values of data records having become outdated by an update statement committed at the moment of modifying the view, and are free of counter values generated by the counter after the moment of modifying the view;

upon determining that one of the database queries comprises a read statement for reading one or more data records from the table, calling the view of the table instead of performing the read statement on the table and forwarding the data records provided by the view to the client application;

upon determining that at least one of the queries comprises a write query for loading a partition of a source database comprising a plurality of data records into the database, receiving a current counter value from the counter and storing the data records of the partition in association with the received current counter value in the database in response to receiving the partition from the source database, wherein the plurality of data records of the partition having assigned a partition-ID of said partition of the source database;

upon committing a load operation, modifying the view of said table such that the particular counter values comprise the counter value stored in association with the data records of the loaded partition and such that the particular counter values are free of counter values of any outdated version of the partition of the source database.

17. The computer system of claim 16, wherein the computer system comprises a client computer system hosting the client application and the program module, the client computer system being connected via a network to a server computer system hosting the database management system.

18. The computer system of claim 16, wherein the computer system comprises a server computer system hosting the database management system and the program module, the server computer system being connected via a network to a client computer system hosting the client application.

* * * * *